March 27, 1951  H. J. HORN  2,546,508
VEHICLE WHEEL
Filed July 18, 1946

INVENTOR
HARRY J. HORN
BY
Carroll R. Faber
ATTORNEY

Patented Mar. 27, 1951

2,546,508

UNITED STATES PATENT OFFICE 2,546,508

VEHICLE WHEEL

Harry J. Horn, Lansing, Mich., assignor to Motor Wheel Corporation, Lansing, Mich., a corporation of Michigan Application July 18, 1946, Serial No. 684,414

4 Claims. (Cl. 301—37)

This invention relates to vehicle wheels and more particularly to the means for detachably connecting ornamental covers thereto.

The principal object of the present invention is to provide a simple and effective attaching device integral with the wheel which is particularly effective in attaching wheel covers to the wheels.

Another object is to provide such an attaching means which is especially economical to manufacture.

These objects will more fully appear in the following specification when read in connection with the accompanying drawings, wherein.

Figure 1:
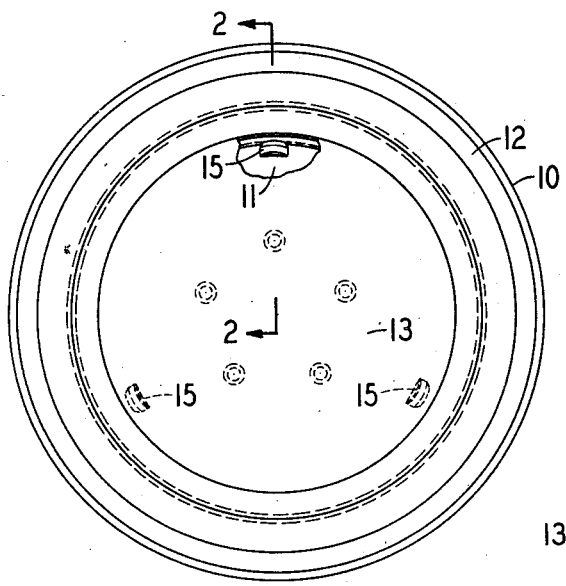
Figure 1 is a front elevational view of a wheel embodying the invention, parts being broken away to more clearly disclose the construction thereof.
Figure 2:
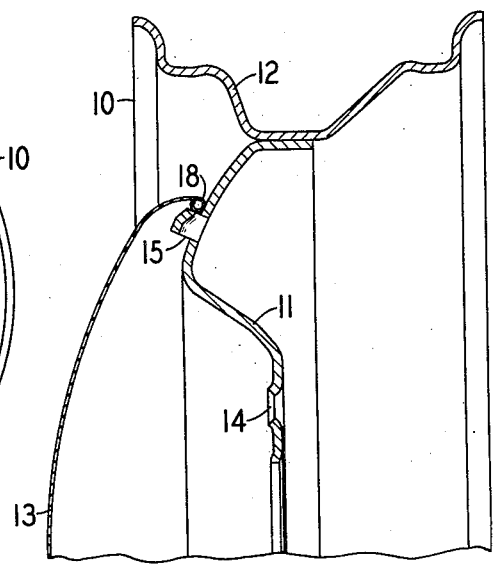
Figure 2 is a fragmentary cross-sectional view on an enlarged scale taken on substantially the line 2—2 of Figure 1.
Figure 8:
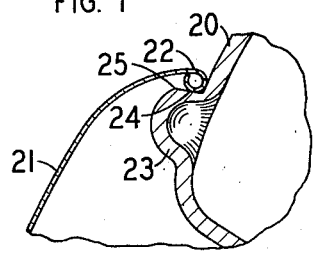
Figure 7:
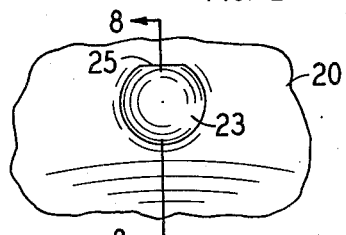
Figure 4:
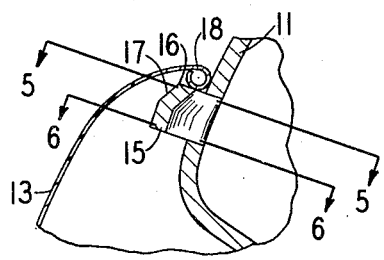
Figure 4 is a fragmentary cross-sectional view taken on substantially the line 4—4 of Figure 3, but with the cover in place.
Figure 3:
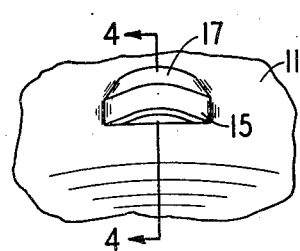
Figure 3 is a fragmentary elevational view on an enlarged scale of a portion of the wheel of Figure 1 with the cover removed.
Figure 5:
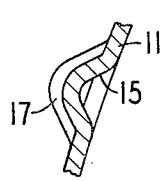
Figure 6:
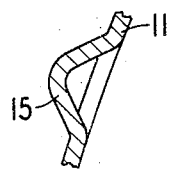

Figures 5 and 6 are fragmentary cross-sectional views taken on the lines 5—5 and 6—6 respectively of Figure 4;

Figure 7 is a fragmentary elevational view of a wheel embodying a modified form of the invention; and Figure 8 is a fragmentary cross-sectional view taken on substantially the line 8—8 of Figure 7.

Figures 1 to 6 illustrate one form of the invention. The invention is shown as applied to a wheel 10 having a wheel body 11, a rim 12, and a cover 13. The wheel body 11 is for the most part conventional, as is the rim 12. The wheel body is provided with a central dished portion having openings 14 therein to receive bolts or cap screws for demountably attaching the wheel to a hub.

Radially outward of the dished portion of the wheel body are three cover attaching bosses 15. The number of these bosses may be varied somewhat, but three has been found to be most desirable. The bosses 15 are integral with the wheel body. They are formed by shearing out strips on radially spaced apart lines and pressing the metal between those lines outwardly into the V-shaped formation shown. The radially outer edges of the V-shaped bosses are straight across, as at 16, but are inclined relative to the wheel axis, as shown in Figure 4. Each boss is also provided with a radially outwardly, axially inwardly inclined portion 17. Thus, a hump is formed at the intersection of the two inclined portions, over which the cover is pressed, as will more fully appear presently.

The cover 13 is a circular dish shaped member, preferably formed from sheet metal. The cover has a rolled bead 18 around its perimeter. The internal circumference of the beaded perimeter of the cover is slightly less than the circumference of a circle passing through the humps on the bosses at the intersection of the inclined portions of the latter.

The cover is applied to the wheel by locating the bead 18 on two of the bosses between the humps thereon and the wheel body proper, and then pressing the bead over the hump on the third boss. The cover will ride up the inclined portion 17 of the third boss and snap over the hump. During this movement of the bead over the hump, the latter will be deformed slightly from its circular shape, resuming such circular shape after the bead has passed the hump. The axially outer corners of the radially outer sides of the legs of the V-shaped bosses will bite into the metal of the bead to some extent, and the cover will be securely attached to the wheel.

The cover can be removed by inserting a prying tool between the wheel body and bead and prying the cover off of the wheel.

The modified form of the invention shown in Figures 7 and 8 employs a plurality of bosses of generally hemispherical shape. The wheel shown comprises a wheel body 20 similar to wheel body 11, a rim not shown, and a cover 21 having a beaded edge 22.

A plurality of generally hemispherical bosses 23 are pressed outwardly from the wheel body on a circle coaxial with the wheel axis. The radially outer portions of the bosses 23 are flattened to provide inclined seats 24 for the beaded edge 22 of the cover. The flattened seats 24 may be formed by pressing or by machining away a portion of each boss.

The inclined flattened seats 24 in association with the spherical surfaces of the bosses form humps 25 over which the bead 22 is snapped in the same manner as described in connection with Figures 1 to 6.

Also, as in the case of the modification shown in Figures 1 to 6, the curved inner surface of the beaded edge of the cover 21 engages the bosses only on the corners of the flat seats, thus providing a biting engagement between the bead and the bosses.

From the foregoing it will be apparent that the present invention provides a very secure means for attaching a cover to a wheel, as well as an extremely economical one.

The scope of the invention is indicated in the appended claims.

I claim:

1. In a wheel having a wheel body, means on said wheel body for attaching a cover thereto comprising a plurality of V-shaped straps integral with, and attached at the extremity of the legs thereof, to said wheel body, said V-shaped straps extending outwardly on the outboard face of the wheel body in circumferentially spaced relation and positioned equidistant from the axis of the wheel body, the radially outer face of each V-shaped strap being planar and inclined inwardly toward the outer face of the wheel body and radially inwardly toward the axis of the wheel body, each V-shaped strap having an axially outer face inclined outwardly from the said radially outer face of the V-strap and radially inwardly toward the axis of the wheel body whereby the two said inclined faces of each V-shaped strap form a hump at their intersection over which the wheel cover is adapted to be pressed.

2. The combination claimed in claim 1 wherein each V-shaped strap is sheared out of the wheel body on radially spaced apart lines and the metal between these lines pressed outwardly into a V-shaped formation.

3. The combination of a wheel having a wheel body, a cover therefor, said cover comprising a dish shaped member having a relatively flexible radially inturned marginal rim, and means for detachably connecting said cover to said wheel comprising a plurality of V-shaped straps integral with, and attached at the extremity of the legs thereof, to said wheel body, said V-shaped straps extending outwardly on the outboard face of the wheel body in circumferentially spaced relation and positioned equidistant from the axis of the wheel body, the radially outer face of each V-shaped strap being planar and inclined inwardly toward the outer face of the wheel body and radially inwardly toward the axis of the wheel body, each V-shaped strap having an axially outer face inclined outwardly from the said radially outer face of the V-strap and radially inwardly toward the axis of the wheel body whereby the two said inclined faces of each V-shaped strap form a hump at their intersection over which the wheel cover is adapted to be pressed, the radially outer extremities of said humps being arranged on a circle of slightly greater circumference than the inner circumference of the inturned marginal portion of said cover, whereby the rim of the cover is distorted when forced over said humps.

4. The combination claimed in claim 3 wherein each V-shaped strap is sheared out of the wheel body on radially spaced apart lines and the metal between these lines pressed outwardly into a V-shaped formation.

HARRY J. HORN.

REFERENCES CITED

The following references are of record in the file of this patent:

UNITED STATES PATENTS

| Number | Name | Date |
|---|---|---|
| 2,020,885 | Gatta | Nov. 12, 1935 |
| 2,308,615 | Lyon | Jan. 19, 1943 |

FOREIGN PATENTS

| Number | Country | Date |
|---|---|---|
| 456,866 | Great Britain | Nov. 17, 1936 |